(12) United States Patent
Goldick

(10) Patent No.: US 7,028,300 B2
(45) Date of Patent: Apr. 11, 2006

(54) METHOD AND SYSTEM FOR MANAGING RESOURCES IN A DISTRIBUTED ENVIRONMENT THAT HAS AN ASSOCIATED OBJECT

(75) Inventor: Jonathan S. Goldick, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 09/992,603

(22) Filed: Nov. 13, 2001

(65) Prior Publication Data

US 2003/0093457 A1    May 15, 2003

(51) Int. Cl.
*G06F 9/46* (2006.01)
(52) U.S. Cl. .............................. 718/104; 707/1; 707/8; 707/9; 709/226
(58) Field of Classification Search .............. 718/100, 718/104; 707/101, 8, 1, 9; 709/226
See application file for complete search history.

(56) References Cited

U.S. PATENT DOCUMENTS

| | | | | |
|---|---|---|---|---|
| 5,023,907 A | * | 6/1991 | Johnson et al. ............ | 710/200 |
| 5,305,448 A | * | 4/1994 | Insalaco et al. ............ | 711/164 |
| 5,367,671 A | | 11/1994 | Feigenbaum et al. ....... | 395/600 |
| 5,448,727 A | * | 9/1995 | Annevelink ................. | 707/101 |
| 5,555,388 A | * | 9/1996 | Shaughnessy ............... | 711/100 |
| 5,734,909 A | * | 3/1998 | Bennett ...................... | 710/200 |
| 5,835,906 A | * | 11/1998 | Hagersten et al. ............ | 707/8 |
| 5,933,825 A | * | 8/1999 | McClaughry et al. ......... | 707/8 |
| 6,026,401 A | * | 2/2000 | Brealey et al. ............... | 707/8 |
| 6,353,828 B1 | * | 3/2002 | Ganesh et al. ............... | 707/8 |
| 6,389,420 B1 | * | 5/2002 | Vahalia et al. ............... | 707/8 |
| 6,493,804 B1 | * | 12/2002 | Soltis et al. ................ | 711/152 |
| 6,618,744 B1 | * | 9/2003 | Simmons et al. ........... | 718/104 |
| 6,708,324 B1 | * | 3/2004 | Solloway et al. ........... | 717/124 |
| 2002/0178249 A1 | * | 11/2002 | Prabakaran et al. ........ | 709/223 |
| 2002/0194526 A1 | * | 12/2002 | Ulrich et al. ................ | 714/6 |
| 2004/0255048 A1 | * | 12/2004 | Lev Ran et al. ............ | 709/249 |

FOREIGN PATENT DOCUMENTS

| | | |
|---|---|---|
| EP | 0 738 982 A2 | 10/1996 |
| EP | 0 738 982 A3 | 10/1996 |
| EP | 0 986 009 A2 | 8/1999 |
| EP | 0 986 009 A3 | 8/1999 |

OTHER PUBLICATIONS

"HTTP Extensions for Distributed Authority—WEBDAV" by Y. Goland, Microsoft; E. Whitehead, UC Irvine; A Faizi, Netscape; S. Carter, Novell; and D. Jensen, Novell, Feb. 1999, Network Working Group, Request for Comments: 2518, Standards Track.

(Continued)

*Primary Examiner*—Meng-Al T. An
*Assistant Examiner*—Lilian Vo
(74) *Attorney, Agent, or Firm*—Merchant & Gould

(57) ABSTRACT

A system and method for managing the allocation of resources and locks to client computer systems. The system and method provides server-side control features related to resource requests for locked resources, such as establishing an expected lifetime property so that the sever may notify requesting clients as to the expected lifetime of a lock to improve client-side polling methods. The system and method relates to blocking a resource or otherwise maintaining subscriptions to lock-related events to effectively allow for asynchronous grants of a lock based on the time of the request to alleviate lock starvation. Another feature relates to a server-side lock function of breaking an existing lock or at least modifying/reducing a lock timeout period to prevent lost resources.

6 Claims, 5 Drawing Sheets

OTHER PUBLICATIONS

EP Search Report for EP 01 13 0444.
M. Norton, "OS/2s Extended Attributes", Technical Support, 'Online!, Jul. 1996; http://www.naspa.com/PDF/96/T9607014, pdf; 2 pages.
Russinovich, M., "Inside On-Access Virus Scanners", Windows & .Net Magazine Network, Sep. 1997, 3 pages.
Patent Abstracts of Japan, vol. 007, No. 138. Jun. 16, 1983 & JP 58 052740 A; Fujitsu Ltd; Mar. 29, 1983.

* cited by examiner

METHOD AND SYSTEM FOR MANAGING RESOURCES IN A DISTRIBUTED ENVIRONMENT THAT HAS AN ASSOCIATED OBJECT

TECHNICAL FIELD

This invention relates generally to distributed computing environments and particularly to availability management of resources in a distributed environment. More particularly, the present invention relates to methods of "locking" distributed environment resources to prevent inappropriate access to such resources. More particularly still, the present invention relates to server-side allocation of locks in the WebDAV protocol.

BACKGROUND OF THE INVENTION

Distributed computer environments, such as computer networks, provide significant advantages to multiple computer clients or users. In particular, distributed environments allow multiple clients to actually share many different computer resources including both hardware and software resources. Sharing software-related resources provides many known benefits, such as the fact that only one such resource needs to be created, updated and maintained.

The Internet is one particular example of a distributed environment that provides access to a considerable number of software resources, which are available to client computer systems having Internet capabilities. One portion of the Internet is known as the World Wide Web which is generally a system of Internet servers that house software related resources that are formatted in a particular manner, such as with HTML (HyperText Markup Language). The protocol for accessing these particular resources is known as the HyperText Transfer Protocol or HTTP. It should be noted however that not all Internet servers are part of the World Wide Web.

Historically, most resources on the Internet corresponded to web page files that included only static HTML code, and thus were only available for display. However, recent advances are being made in the representative functionality provided to client systems to provide more interaction between the client and server systems. For instance, clients may effectively author resources on a server system from client systems over distributed networks, including the Internet. Indeed, much time and effort has been spent on the development of a WebDAV protocol or standard, which stands for the World Wide Web Distributed Authoring and Versioning standard, referred to herein as simply "DAV." DAV provides a set of headers and methods which extend HTTP to provide capabilities for managing properties, namespace and other items from a client system in order to allow client computer systems to access server-side resources for the purpose of editing those resources. Proposed Standard RFC 2518, which is a document written by the IETF and approved by the IESG, published February 1999, describes DAV in more detail.

As part of the DAV standard, server computer systems provide various services in managing the various access requests made by clients. One particular service relates to managing resource availability for clients. That is, DAV provides methods that allow a client to lock a resource when using that resource so that subsequent users may not access that resource during that time. This locking scheme helps prevent the "lost update" problem associated with two or more users modifying a resource simultaneously such that editions are inadvertently lost.

Unfortunately however, the DAV protocol is limited in its ability to satisfactorily allocate previously locked resources to requesting clients. That is, once a resource is unlocked, then the server computer system simply allocates the resource to the next client that sends a request for that resource. While relatively simple, the method of allocating the resource to the next request is unsatisfactory as it forces clients to repeatedly and almost continuously request a locked resource. Repeated requesting of a resource by a client significantly impacts the performance of the client computer system because the client computer system must devote its own resources to preparing and sending a request while these resources could be performing other tasks.

In order to improve performance, the client computer systems typically employ a method of choosing a predetermined time interval between requests for locked resources. Unfortunately however, choosing a time interval that is too long may jeopardize the chances of accessing a resource as an intervening request by a different client may occur between the time of the unlock event and the next request. Indeed, since an intervening request may always appear prior to any other request, any particular client may suffer from lock starvation, i.e., a complete failure to gain access to a requested resource. Therefore, choosing a time interval necessarily requires the client to balance performance issues with the importance of accessing the resource. Achieving a satisfactory balance is difficult at best, and such guesswork cannot guarantee that a resource will ever be accessed, based on other client request rates.

One method of solving this problem relates to evaluating an existing lock using a "lock discovery" method that evaluates an existing lock to determine properties such as whether a timeout period has been set. In DAV, the timeout period for a resource is a values set by the owner or the server system and provides a means by which the server can limit the lifetime of a resource lock. Upon expiration of the timeout period, the server may harvest the lock and reallocate the resource to the next client that requests the resource. By discovering the timeout period, a client may wait until that period has expired before sending another request for the resource. Unfortunately however, this solution is unsatisfactory since the lock creator typically chooses a timeout period that far outlasts the actual time needed for the resource. Indeed, since the nature of a requested timeout period relates to when the lock expires or may be harvested by the server, clients typically choose as long a period as possible. If not, the lock owner risks having a lock expire before the owner is finished with the resource. Consequently, subsequent clients cannot rely on the timeout period as a means for realistically determining when to retry a request.

Another drawback associated with the timeout period used in DAV, i.e., the time period by which the lock automatically expires, is that the timeout period may actually be set for an infinite duration. This causes a significant problem, especially when the client does not explicitly release or unlock the resource when the client does not need the lock any longer. The problem is exacerbated when the client owning the lock orphans the lock and thus cannot explicitly release the resource. In such a case, there is essentially no method of killing or breaking the lock.

It is with respect to these and other considerations that the present invention has been made.

SUMMARY OF THE INVENTION

The present invention relates to a system and method for managing the allocation of locks to clients. The system and method provides server-side control features related to resource requests for locked resources, such as establishing an expected lifetime property so that the sever may notify requesting clients as to the expected lifetime of a lock to improve client-side polling methods. Also, the present invention relates to blocking a resource or otherwise maintaining subscriptions to lock-related events to effectively allow for asynchronous grants of a lock based on the time of the request to alleviate lock starvation. Another feature relates to a server-side lock function of breaking an existing lock or at least modifying/reducing a lock timeout period to prevent lost resources.

In accordance with certain aspects, the present invention relates to a system and method of managing a locked resource in a distributed environment that receives a request to access the resource from a requesting client computer system and determines whether the resource has a conflicting lock. Next, if the resource has a conflicting lock, information about the lock is returned to the requesting client computer system so that the client computer system may modify its retry strategy. On the other hand, if the resource does not have a conflicting lock, the requested access is allowed. In an embodiment, the lock information is related to the expected lifetime of the lock and is set by the lock owner. In another embodiment, the lock information relates to the exclusivity of the lock.

In accordance with other aspects, the present invention relates to a system and method of allocating access to a resource in a distributed environment. The invention receives a request to access the resource from a requesting client computer system and then determines whether the resource has a conflicting lock. If the resource has a conflicting lock, the invention blocks the resource for the requesting client computer system until the resource is free and then performs the requested access, allocating a new lock to the requesting computer system. In an embodiment the initial request for access has a request to block the resource. The request to block the resource may be a predetermined header having a time value for defining a time period to block the resource.

In accordance with yet other aspects, the present invention relates to a system and method of unlocking a locked resource in a distributed environment, the locked resource having a lock object associated with a lock owner. Upon receiving a request to access the locked resource from a client computer system other than the lock owner, the invention determines whether the request comprises a request to break the lock object and then determines whether the requesting client computer system is cleared to break the lock object. If so, the lock object is removed from the resource so that the requesting client may obtain access to the resource if desired. In an embodiment, the lock owner is notified of the request to break the lock before removing the lock object and given time to perform actions relative to saving information or updating the existing lock.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

Figure 1:
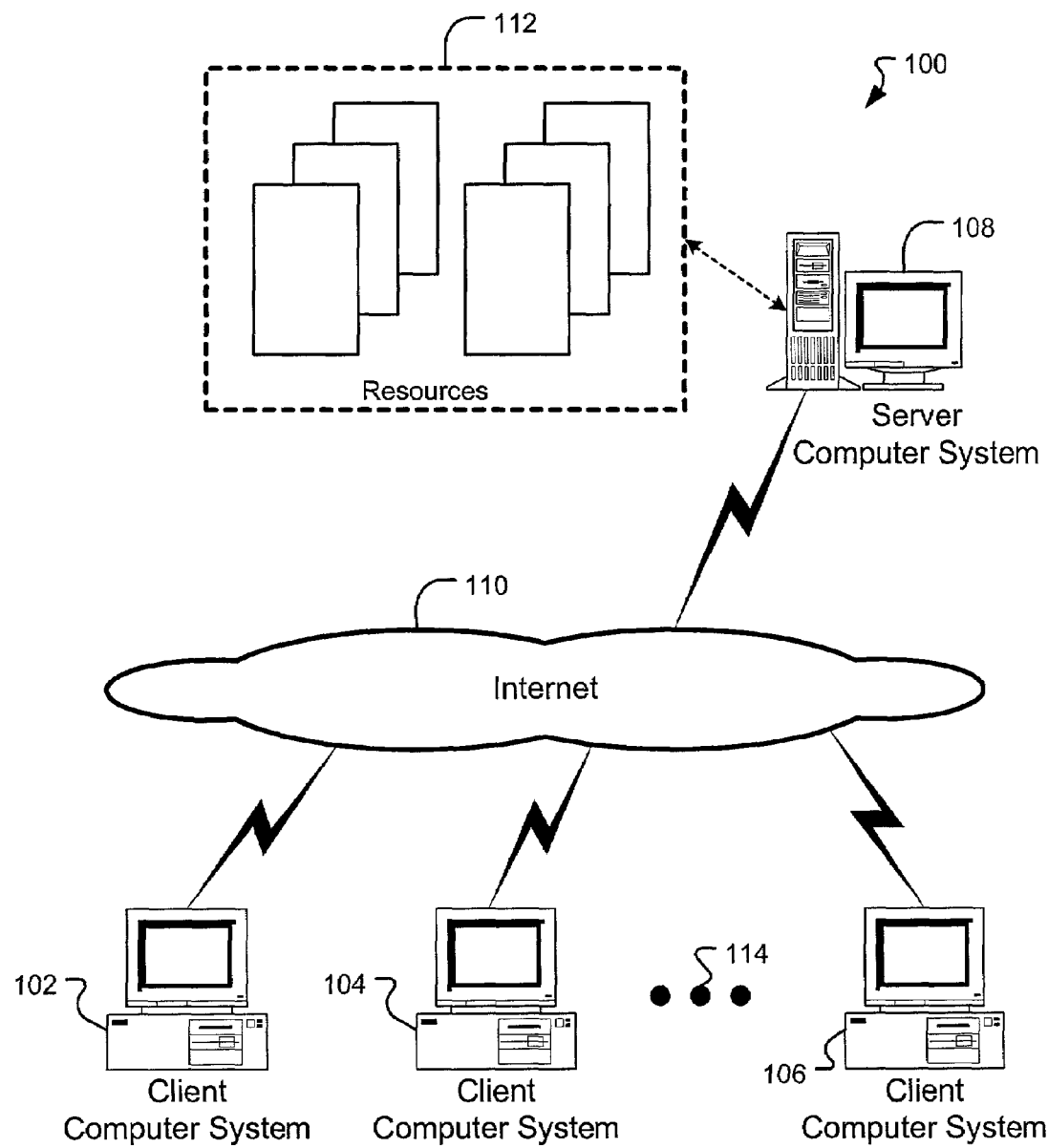
FIG. 1 is a diagram of a distributed environment having a client computer system and a server computer system that communicate according to principles of the present invention.

A distributed environment 100 incorporating aspects of the present invention is shown in FIG. 1. The environment 100 has at least one client computer system, such as client computer systems 102, 104 and 106 that interact with at least one server computer system, such as server computer system 108 over a distributed network, such as the Internet 110. The client computer systems 102, 104 and 106 request access to one or more server computer resources 112. Additionally, there maybe other client computer systems as indicated by ellipses 114. The resources 112 relate to computer readable files or objects, such as text documents, application program modules, data objects, properties or attributes for data objects, among others. The resources may be HTML, XML, SGML files, or in other embodiments, the resources may be in another format.

In an embodiment of the invention, the protocol used by the systems 102, 104, 106 and 108 to communicate is the WebDAV (World Wide Web Distributed Authoring and Versioning, hereinafter "DAV") protocol. DAV is an extension of the Hypertext Transfer Protocol version 1.1 (HTTP) and provides the methods and formats for allowing client computer systems, such as computer systems 102, 104 and 106 to access and edit computer resources 112. As stated in the Background Section above, DAV also provides a set of headers and methods, which extend the HTTP to provide capabilities for property and namespace management, among other features as discussed in Proposed Standard RFC 2518.

As one client computer system, such as system 102, accesses one of the resources 112, that resource may be locked such that the other client computer systems, such as systems 104 and 106 are unable to access the resource. In other embodiments, one or the other computer systems 104 and 106 may access the locked resource, but only for limited purposes, such as to write to the resource, read the resource or to delete the resource depending on the type of lock used on the resource by the first client computer system.

The server computer system 108 services requests for resources 112 and allocates available resources accordingly. Moreover, the server computer system 108 denies requests for resources that are not available, i.e., those resources that have conflicting locks. A conflicting lock is a lock that conflicts with the particular type of request for the resource. For example, if the lock is an exclusive lock then it conflicts with any subsequent request, but if the lock is a non-exclusive lock that allows others to read the resource, then the lock does not conflict with requests to access the resource to read the resource.

In an embodiment of the invention, the server computer system 108 further provides services relating to providing information to the lock owner or another requesting client. The information provided to the client may be associated with the expected lifetime of an existing or conflicting lock or it may relate to other lock properties, such as the degree of exclusivity of a lock. In another embodiment, the server computer system 108 provides methods of reducing the lifetime of a conflicting lock and/or breaking the conflicting lock. In yet another embodiment, the server computer system allows for clients to subscribe to lock related events, such that the client may perform a specific request for a resource based on the occurrence of the event, e.g., an unlock-event. In yet another embodiment, the server computer system provides the client the ability to block a resource until it becomes available, and to therefore receive access to the resource once it is available, prior to other subsequent client requests. These features are described in more detail below.

Figure 2:
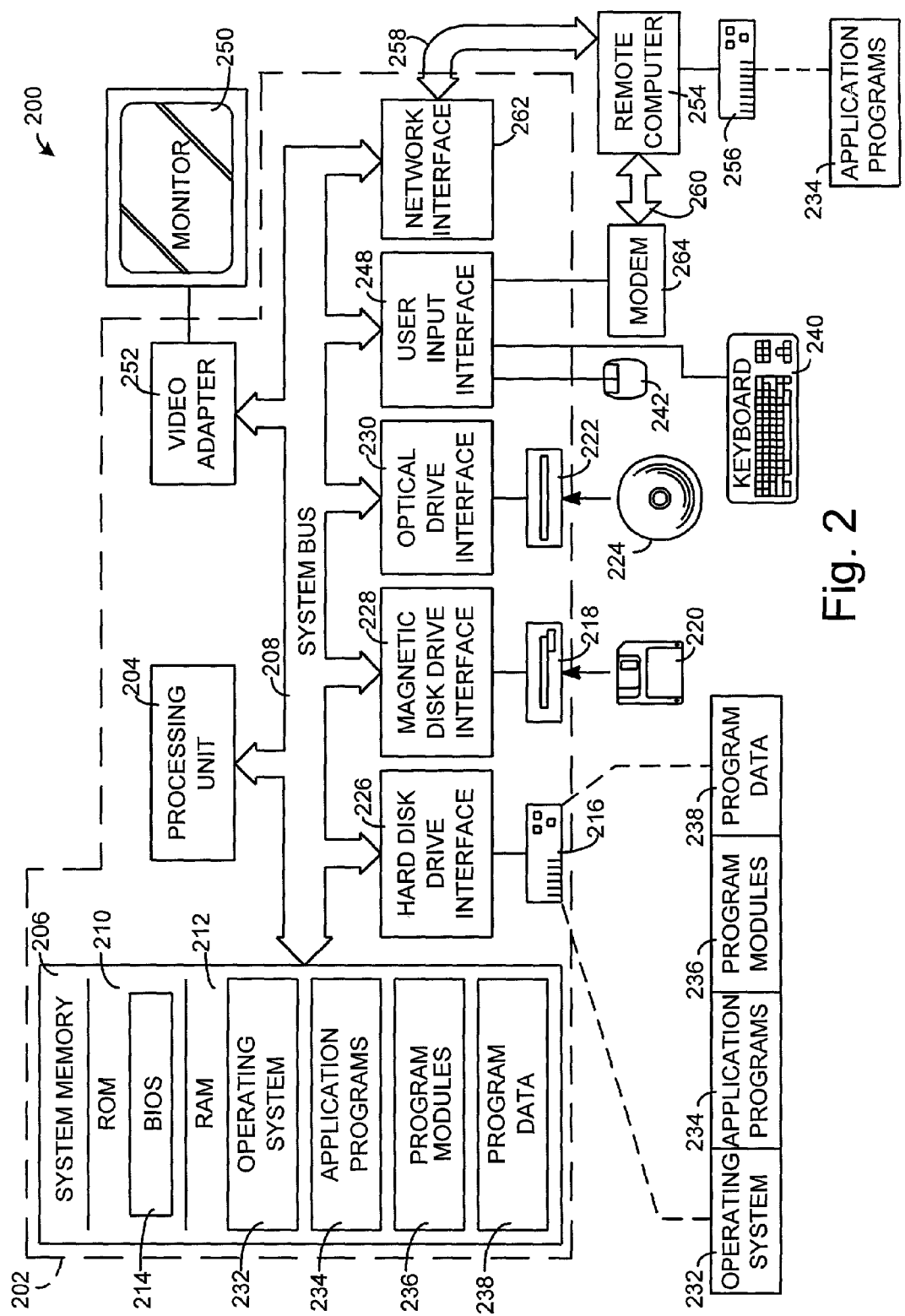
FIG. 2 is a functional diagram of a computer system that may incorporate aspects of the present invention.

FIG. 2 illustrates an example of a suitable computing system environment 200 in which aspects of the present invention may be implemented as either a client computer system such as systems 102, 104 or 106 or server computer system 108. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

Environment 200 incorporates a general-purpose computing device in the form of a computer 202. Components of computer 202 may include, but are not limited to, a processing unit 204, a system memory 206, and a system bus 208 that couples various system components including the system memory to the processing unit 204. The system bus 208 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architectures (MCA) bus, Enhanced ISA (EISA) bus, Video Electronics Standards Association (VESA) local bus, and Peripheral Component Interconnect (PCI) bus also known as Mezzanine bus.

Computer 202 typically includes a variety of computer readable media. Computer readable media can be any available media that can be accessed by computer 202 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDE-ROM, digital versatile disks (DVD) or other optical disk storage, magnetic cassettes, magnetic tape, magnetic disk storage or other magnetic storage devices, or any other medium which can be used to store the desired information and which can be accessed by computer 202. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 206 includes computer storage media in the form of volatile and/or nonvolatile memory such as read only memory (ROM) 210 and random access memory (RAM) 212. A basic input/output system 214 (BIOS), containing the basic routines that help to transfer information between elements within computer 202, such as during start-up, is typically stored in ROM 210, while RAM 212 typically contains files and/or program modules that are immediately accessible to and/or presently being operated on by processing unit 204. By way of example, and not limitation, FIG. 2 illustrates operating system 232, application programs 234, other program modules 236, and program data 238.

The computer 202 may also include other removable/non-removable, volatile/nonvolatile computer storage media. By way of example only, FIG. 2 illustrates a hard disk drive 216 that reads from or writes to non-removable, nonvolatile magnetic media, a magnetic disk drive 218 that reads from or writes to a removable, nonvolatile magnetic disk 220, and an optical disk drive 222 that reads from or writes to a removable, nonvolatile optical disk 224 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 216 is typically connected to the system bus 208 through a non-removable memory interface such as interface 226, and magnetic disk drive 218 and optical disk drive 222 are typically connected to the system bus 208 by a memory interfaces, such as interfaces 228 and 230, respectively.

The drives and their associated computer storage media discussed above and illustrated in FIG. 2, provide storage of computer readable instructions, data structures, program modules and other data for the computer 202. In FIG. 2, for example, hard disk drive 216 is illustrated as storing operating system 232, application programs 234, other program modules 236, and program data 238.

A user may enter commands and information into the computer 202 through input devices such as a keyboard 240 and pointing device 242, commonly referred to as a mouse, trackball or touch pad. Other input devices (not shown) may include a microphone, joystick, game pad, satellite dish, scanner, or the like. These and other input devices are often connected to the processing unit 204 through an input interface 248 that is coupled to the system bus 208. A monitor 250 or other type of display device may also be connected to the system bus 208 via video adapter 252. In addition to the monitor, computers may also include other peripheral output devices such as speakers and printer not shown.

The computer 202 may operate in a networked environment using logical connections to one or more remote computers, such as a remote computer 254. The remote computer 254 may be a personal computer, a server, a router, a network PC, a peer device or other common network node, and typically includes many or all of the elements described above relative to the computer 202.

When used in a LAN networking environment, the computer 202 is connected to the LAN through a network interface or adapter 262. When used in a WAN networking environment, the computer 202 typically includes a modem 264 or other means for establishing communications over the WAN, such as the Internet. The modem 264, which may be internal or external, may be connected to the system bus 208 via the user input interface 248, or other appropriate mechanism. In a networked environment, program modules depicted relative to the computer 202, or portions thereof, may be stored in the remote memory storage device. It will be appreciated that the network connections shown are exemplary and other means of establishing a communications link between the computers may be used.

In addition to the environment 200 shown in FIG. 2, the invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Moreover, the present invention may be described in the general context of a software operating environment, e.g., computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
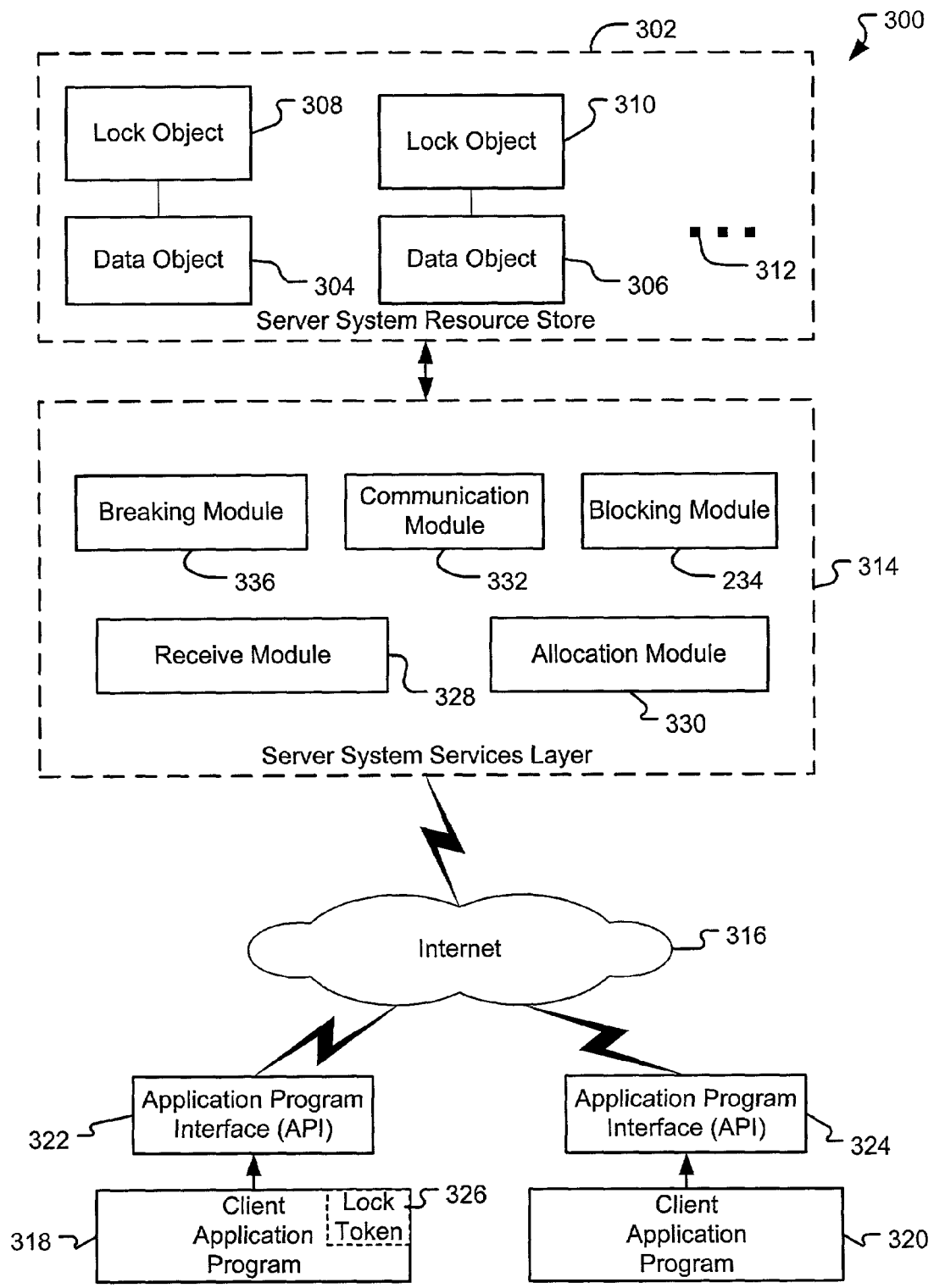
FIG. 3 is a block diagram illustrating software components of the present invention, including a services layer for managing the server-side lock allocation.

FIG. 3 illustrates an example of a software operating environment 300 in which the invention may be implemented. The software operating environment 300 is only one example of a suitable operating environment and is not intended to suggest any limitation as to the scope of use or functionality of the invention. Software environment 300 incorporates a Server System Resource Store 302 which defines the format and structure of data objects, such as data objects 304 and 306. Typically, the Server System Resource Store 302 also provides the overall structure in which objects are named, stored and organized. Additionally, the store provides the protocols for accessing any object within the store 302. In an embodiment, Store 302 is an XML store and has data objects defined by the XML standard. However, it is contemplated that other data object configurations or collections may incorporate the aspects of the present invention. Data objects 304 and 306 are data objects that represent actual file-type data. The objects 304 and 306 may be accessed and/or modified by a user or another program module. Of course, the Store 302 may comprise many other objects as indicated by ellipses 312.

Typically, each data object 304 and 306 has some form of meta information object (not shown) that is associated with each object, the meta information comprises information such as the author of the object, the time the object was last accessed, among others. This meta information may be stored as part of the data object or as part of another object having a pointer or some other identifying element that associates the meta information object with its particular data object.

In addition to the meta information objects, a data object may also be associated with a lock object, such as objects 308 and 310. Lock objects 308 and 310 are associated with data objects 304 and 306, respectively. Lock objects comprise information related to whether its associated data object is locked and therefore inaccessible by other client computer systems. Additionally, lock objects 304 and 306 may provide other properties, such as type properties relating to locking methods, and/or the servicing of lock token requests. As discussed below, one property that may be included in a lock object relates to an expected lifetime value. Although shown as separate objects, a lock object, such as lock objects 308 and 310, may be incorporated into its associated data object as part of a header or some other meta-information portion of the data object.

Environment 300 also has a services layer 314, which relates to server functionality in servicing access requests for data objects 304 and 306. The services layer 314 may provide various functions, such as ensuring that an object access request complies with the existing protocol; whether the request relates to either an existing object or, in DAV, to an object that is to be created; whether the module making the request has permission to make and perform the request; among others. The services layer 314 also manages the availability of resources based on lock analysis as discussed in more detail below.

The services layer 314 receives requests over a distributed network environment, such as Internet 316. The requests are made by client computer applications, such as applications 318 and 320. In one embodiment, application program 318 is a client application program that operates on a client system apart from a server system, wherein the server system is the physical location of the Store 302. In other embodiments however, the application program, i.e., program 318 may actually be part of the server system. Applications 318 and 320 interact with the distributed network environment 316 through application program interfaces 322 and 324, respectively. The access requests may involve requests to move, copy, delete, read, execute or update a resource or object, such as object 304 or object 306.

With respect to the lock objects 308 and 310, in an embodiment of the invention, application programs 318 and 320 may cause the creation of lock objects 308 and 310 related to objects 304 and 306 respectively. Alternatively, the services layer 314 may create the lock objects, and associate the objects with the data objects. Once a lock object, e.g., lock object 308, has been created, another application may determine the existence of such a lock object and access the locked data object only in accordance with parameters set by the lock object, if at all.

In one particular example, the services layer 314 actually performs the creation and management of the lock objects 308 and 310. The services layer 314 receives a request from a client application program, such as application 318. The services layer then processes the request, i.e., determines whether the client application may access the data object in the requested manner. If the application is able to access the data object in the requested manner, the services layer returns a lock token 326 to the client application program 318 and allows the requested access. If the services layer 314 determines that the application program may not access the requested data object due to the existence of a conflicting lock, access is denied.

To further this example, assume application program 320 attempts to access a data object that is locked by client application 318, as evidenced by the lock token 326. When locked with a conflicting lock, such a case the application 320 typically cannot access that data object until client application 318 expressly frees the lock token 326. However, as discussed in more detail below, the lock may be broken by the services layer or modified to free the lock prior to an express unlock request made by application 318.

In an embodiment of the invention, the services layer 314 comprises a plurality of modules for performing separate functions relating to lock services and allocation. For instance, the services layer 314 comprises a receive module 328 and an allocation module 330. The receive module 328 receives the request for a particular resource, such as resources 304 and 306 from a client application program and parses the request. The receive module 328 determines whether the resource is available with respect to any potentially conflicting lock objects. Assuming there is no conflicting lock, then allocation module 330 operates to allocate the resource to the requesting client application program. Otherwise, if the resource has a conflicting lock object, the allocation module 330 does not allocate the lock.

In an embodiment, the services layer 314 has a communication module 332 that provides information to the requesting client application relating to a denial of access to a requested resource. The information may involve a simple statement of denial or may also include the reason for the denial, e.g., the existence of a conflicting lock. The communication module 332 may provide even further information to the requesting client application program relating to specific properties of the conflicting lock object. The information provided by the communication module 332 allows the client application program to modify its requesting method, if necessary. For example, the communication module may provide information such as the expected lifetime of the lock object. The information related to the expected lifetime of the lock object allows the client application program to determine when to send another access request. As another example, the communication module 332 may provide information related to the type or scope of the conflicting lock allowing the client to modify the type of request, if feasible, to gain access to the resource, albeit in another capacity.

In one embodiment, the services layer 314, and its communication module 332 automatically returns information related to the specific properties of an existing lock when denying access to a requested resource. Alternative embodiments, however, return such information when requested to do so by a client application program. In the latter case, the client application program may request the specific information in response to a received denial of access or the client application program may include such a request in its initial request for the resource itself.

The communication module 332 determines the specific property information by evaluating meta information of the lock object. The meta information for the lock may include such information as the lock owner, the type and scope of the lock, the time the lock was created, the timeout period of the lock and/or the expected lifetime of the lock. The type and scope of the lock may refer to whether the lock is mandatory or advisory, whether the lock may be shared and, if sharable, to what extent, e.g., to read only. The timeout period of the lock typically refers to a time set by the protocol defining such locks and may be longer or shorter than the expected lifetime of the lock.

The expected lifetime of the lock relates to a time value set either by the lock owner or by default and may include, explicitly or implicitly, the number of expected refresh instances. Thus, the expected lifetime value relates to a value near the actual lifetime of a resource lock. The expected lifetime value will most likely be less than the timeout value, although not required. Other potential clients may discover the expected lifetime value, which allows these clients to poll for lock availability in a more efficient manner. Importantly, the expected lifetime value requested by the client application program is not used by the server system to break or harvest locks for being stale in the way the timeout value is used. Instead the expected lifetime value is primarily a source of information for other client applications so lock owners may supply a sincere guess as to the time the resource will actually be used without risking a timeout situation and losing the lock.

In DAV, in order to implement an expected lifetime property associated with lock objects, an "expectedlifetime" request header may be used. The expectedlifetime header is analogous to a "timeout" request header and has the same value format. The header should only be used in requests to create or to modify a lock. Again, the purpose of the header is to indicate how long the client expects to need a lock so that other clients that fail to acquire a conflicting lock may determine a meaningful time to retry.

In an embodiment having an "activelock" XML element, such as the activelock element in DAV, the element may be extended to support the expectedlifetime property in order to implement this aspect of the invention. The expectedlifetime property may therefore be a new type of DAV property having the same live/dead degree of freedom as other DAV properties, i.e., where a live property is managed at a server and dead property is managed at the client. The value relates to a time value and may be updated and or modified by the client application program.

The document type definitions (DTD) used to define the expectedlifetime property are shown in Table 1. Although DTDs are shown, schemas could also be used.

TABLE 1

Sample DTD Definitions For Expected Lifetime Property

1 Name: activelock
  Namespace: DAV:
  Purpose: Describes a lock on a resource.
  Description: This element describes an active lock on a resource. Although shown as having owner, timeout and expectedlifetime properties, other properties may also exist, such as lockscope, locktype, depth, etc.
  <!ELEMENT activelock (owner?, timeout?, expectedlifetime?)>
2 Name: expectedlifetime
  Namespace: DAV:

TABLE 1-continued

Sample DTD Definitions For Expected Lifetime Property

Purpose: Defines how long the client expects to hold the lock without explicitly unlocking or modifying the lock.
Value: Time value, such as "TimeType" used for the timeout property.
<!ELEMENT expectedlifetime (#PCDATA)>

As shown in Table 1, the new expectedliftetime property has been defined for DAV. The expected lifetime request header defines a time value, such as an integer value related to the number of seconds the client expects to use the resource. The request header may appear as follows: Expectedlifetime="Expectedlifetime" ":" 1#TimeType. Unlike timeout request headers, an expectedlifetime request header has a single value.

As discussed above, the expected lifetime information may be delivered to a subsequent client application program in response to a request for the locked resource. The client, in turn, may use this information to determine when to repeat the request for the resource. By determining when to repeat the request, the client application program may improve its performance by freeing resources for other tasks that might otherwise be used in requesting a resource during a timeframe in which the resource is most likely locked and therefore unaccessible.

While the expected lifetime information allows the client to better determine when to repeat a request, the services layer 314 may also, or alternatively, include a blocking module 334, which blocks future requests for a particular, locked resource. That is, when a client application program locks a resource and another client application issues a request for that resource and that request is denied due to the existing lock, the later client application program may establish a block for the resource. The block operates to prevent other client applications from obtaining the resource. More particularly, the block operates to prevent others from obtaining the resource after the initial client application program has unlocked the resource thereby allowing the subsequent client application program which established the block to access the resource.

In order to establish a block, the client application program indicates that such a block should be created. Next, the blocking module 334 may store an identification value for the blocking client application program. Since all requests for the resource go through layer 314, the layer 314 and its blocking module 334 does not allow any other client application programs to gain access to a blocked resource. Once the resource is free of the conflicting lock, the blocking module 334 may then notify the client that established the block of the status of the resource to allow that client to make another request. Alternatively, the blocking module 334 may actually provide access to the resource once the resource is free.

Once a block is in place, in order to determine the status of a resource, the blocking module 334 may automatically and repeatedly poll the resource to determine its status, e.g., locked or free. Alternatively, the blocking module may simply wait for future requests for the resource, whether made by the blocking client application program or another, and make the determination at that time. In the latter case, the blocking application program would most likely be set to repeatedly request the resource to ensure access. Blocking in this manner allows clients to avoid the starvation issues associated with polling lock acquisitions.

In an embodiment, such as in the DAV environment, the requesting client may supply a "block header" to the server to indicate that a block should be established. In a particular embodiment, a "maxwaittime" request header may be used. The maxwaittime header has the same value format as the timeout request header and is used primarily in lock and update lock requests. The maxwaittime header indicates a time period for blocking the resource, which is related to the time that the client is willing to wait for the lock to be unlocked. The request header may appear as follows: Maxwaittime="Maxwaittime" ":" 1#TimeType. The header must have at least one value and may have several as is the case with timeout request headers in DAV.

Once received, the services layer modifies the lock object to include the max wait time valve as a stored property within, or associated with, the lock object. This allows others to simply test the lock to determine whether another client has created a block and for how long.

In some cases, waiting for a lock to be freed, either by timing out or by an exclusive unlock event is not sufficient. Thus, the services layer 314 may also comprise a breaking module 336, which provides a lock breaking function. In essence, given that locks in certain protocols, such as DAV, can have infinite timeout or lifetime periods, there must be a way to break a lock, especially under certain situations, e.g., where a client has orphaned the resource and is unable to unlock the resource. In order to break a lock, however, the breaking module may first determine whether the resource has actually been orphaned or whether the resource is still in use. If the resource is still in use, the server may send a notice to the owner indicating the impending lock break function. Additionally, since the breaking module 336 may also break locks on resources that have not been orphaned, the breaking module may perform a security check to ensure that the requesting application program has adequate security clearance to perform the breaking function.

In an alternative embodiment, the breaking module 336 can not only break locks, i.e., completely eradicate a lock object, but can also modify the remaining lifetime of a lock to effectively cause the end of a lock at a predetermined time. In such a case, the modification may also test for security clearance and/or provide the lock owner with information related to the modification to its lock.

In order to implement the breaking module, i.e., the ability to break a lock, the protocol, such as DAV, is extended to allow clients or other principals to issue an "unlock" request for a lock token originally acquired by another principal. In order to prevent mistakes, the unlock request may specifically indicate that a lock break is intended within a new request-header. Furthermore, the request should be able to specify a latency before the break actually occurs to allow the server computer system to notify the client that owns the lock that a break is about to occur and give it sufficient time to store any pending changes covered by that lock.

In order to achieve these functions, a "breaklatency" request header may be implemented in the protocol. The breaklatency header is used in unlock requests made by those other than the lock owner and indicates how long the server should wait before actually breaking the corresponding lock. The presence of a breaklatency header indicates that the request is not a normal unlock request, i.e., an unlock request made by the existing lock owner. In an embodiment, the server is not required to wait the requested latency period. Prior to breaking the lock, the server may return a status code indicating the perceived likelihood of whether the unlock request, i.e., the lock break will succeed.

Alternatively, the server sends a response following the breaking of the lock, if at all.

In an embodiment, such as the DAV environment, the breaklatency request header may appear as follows: BreakLatency="Breaklatency" ":" 1#TimeType. Unlike a timeout request header, the breaklatency request header has one value. The following table, Table 2, includes an example of the breaklatency request header. In this example the latency is 60 seconds and the request succeeds. The "204" code is used for successful unlock responses. In this example, the nonce, response, and opaque fields have not been calculated in the Authorization request header.

TABLE 2

Example Use of a Breaklatency Request Header

>>Request
UNLOCK/container/HTTP/1.1
Host: webdav.microsoft.com
Breaklatency: Second-60
Lock-Token:
<opaquelocktoken: e71d4fae-4may-22d6-fea5-00a0c91e6be4>
Authorization: Digest username="jgoldick",
realm="jgoldick@webdav.microsoft.com", nonce="...",
uri="/container/",
response="...", opaque="..."
>>Response
HTTP/1.1 204 No Content In an alternative implementation, suitably privileged or authorized principals are allowed to issue a lock or an update-lock request that effectively reduces the timeout of an existing lock owned by another client. The server may perform the decision as to which principal(s) may be suitably authorized, i.e., it may be a server-level decision. Alternatively, the developer may also provide an indication as to which systems may be authorized. If the original lock owner fails to request access that would result in the lock being refreshed, an effective lock break will have occurred. In order to implement locking and updating by others, the breaklatency request header may be used in lock and update-lock requests. Furthermore, the presence of the breaklatency request header indicates that the request is by one other than the lock owner and therefore normal security checks do not apply, and stricter checks may be implemented.

More details of an update lock technique that may be used to change a break latency request may be found in the U.S. patent application Ser. No. 09/992,525, entitled METHOD AND SYSTEM FOR MODIFYING LOCK PROPERTIES IN A DISTRIBUTED ENVIRONMENT, incorporated herein by reference for all that it discloses and teaches, filed concurrently herewith, and assigned to the Assignee of the present application.

Figure 4:
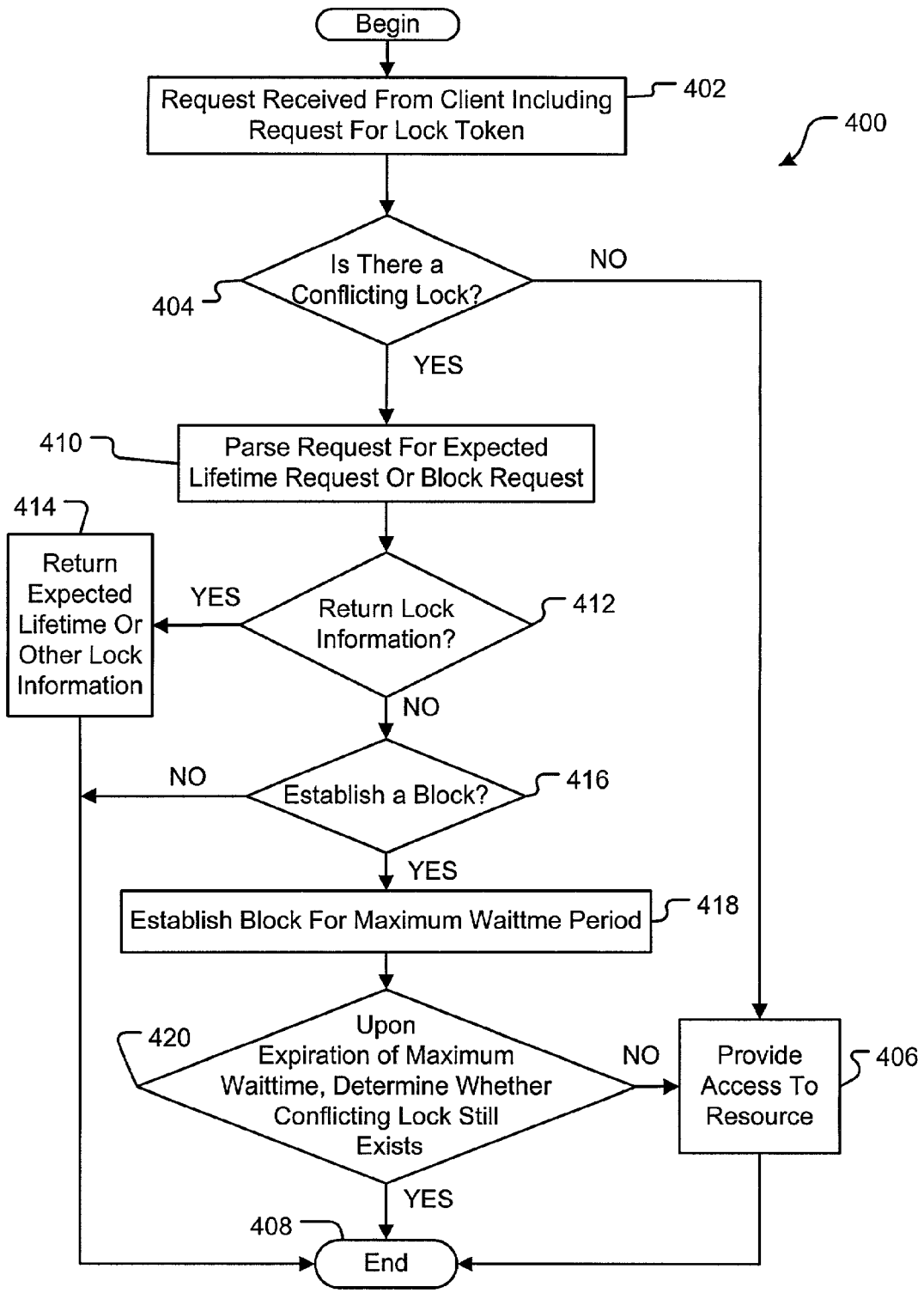
FIG. 4 is a flow diagram illustrating the functional components of communicating lock information in response to a request for a locked resource and/or blocking a locked resource according to the present invention.

FIG. 4 is a flow chart of the operational characteristics related to allocating resources, returning information related to a locked resource and blocking locked resources. Prior to the beginning of flow 400 an object, such as object 304 and/or 306 shown in FIG. 3, may already exist within a Server System Resource Store, such as store 302. In such an embodiment, once the object has been created, then any later attempt to access that object initiates the flow 400 shown and described with respect to FIG. 4. In an alternative embodiment however, e.g., such as when the DAV protocol is used, the object may not exist prior to flow 400. In such a case, a lock object may be created in parallel with the creation of a data object, or the lock object may be created and later associated with the data object once the data object is created.

Process 400 generally begins with receive operation 402, wherein the receive operation 402 relates to the receipt, by the server system of any access request related to an object. The access attempt may be performed by a third party application, such as application 318 or 320 (FIG. 3) or by the services layer 314, among others. The access request incorporates information related to the type of access that is being requested, i.e., to read, to write, to delete, etc. Additionally, the request information may also include information as to the type of lock to be created and applied while the object is in use. Moreover, the request information may also include a request for existing lock information if a conflicting lock exists, blocking information and or breaking information as discussed below.

Following receive operation 402, determination act 404 determines whether the access may be allowed by determining whether a conflicting lock exists. A conflicting lock is a lock owned by another client application program and wherein the scope of the lock is set such that the subsequent request cannot be allowed, e.g., the lock is an exclusive lock or the lock only allows others to read the resource but the subsequent request is to write to the resource. The term conflicting lock is used since some locks may not conflict with subsequent requests since locks may provide limited sharing capabilities, e.g., where the lock allows others to read the resource and the subsequent request is to read the resource.

Determining whether the resource has a conflicting lock, in an embodiment of the invention, involves requesting lock properties from the resource object itself. In such a case, the resource maybe associated with a lock object, such as objects 308 and 310 (FIG. 3) and the lock objects may be evaluated to determine the type of lock, if any, presently being enforced for the requested resource. In other embodiments, the determination relates to an evaluation of a look-up table that is managed by the services layer 314. Yet other embodiments may incorporate other means of providing information related to whether an object is locked and, if so, the type of lock.

If determination act 404 determines that the requested resource may be accessed, i.e., that no conflicting lock exists, flow branches NO to provide-access operation 406. Provide-access operation 406 provides the requesting client application access to the requested resource. Additionally, operation 406 may perform the creation and/or association of a new lock object or other lock-related data structure with the requested object. The type of lock object that is created relates to the type requested by the client application. Further, should a lock be created by operation 406, then the lock object generated by operation 406 may then be evaluated during other access requests until the lock object is removed or invalidated. Following operation 406, flow 400 ends at 408.

If determination act 404 determines that the requested resource may not be accessed, i.e., that a conflicting lock exists, then flow branches YES to parse operation 410. Parse operation 410 parses the incoming request to determine if the request has headers or other indicators that information is requested, that a block is requested, etc. Once parsed, determination operation 412 determines whether the request includes a request for lock information.

If the request includes a request for information, then flow branches YES to operation 414 which returns requested lock information, such as expected lifetime or type and scope information. In alternative embodiments, return operation 414 automatically returns lock information regardless of whether the initial request asks for this type of information.

However, given that some client applications are not prepared to use such information, it may be preferred to perform the test operation 412 to determine whether the client application desires such information.

The type of information returned to the client application may be either a value related to the expected lifetime of the lock, as set by the lock owner, or it may also relate to the type and scope of the lock. This information allows the client to tailor its next request for the resource, either to a request that does not conflict with the existing lock or to adjust the timing of the next request to increase the probability that the resource will be free at that time.

Following the return of lock information operation 414, the flow ends at end operation 408.

If determine operation 412 determines that the request does not include a call for returned lock information then flow branches NO to test operation 416, which determines whether a block should be established. Alternative embodiments may determine whether a block should be established independently of determination operation 412, e.g., following parse operation 410. Test operation 416 tests the initial request to determine whether a block should be placed on the resource. If not, then flow branches NO to end operation 408. In other embodiments, the client may send a subsequent request intended to actually establish the block and this subsequent request is analyzed by an operation similar to test operation 416.

One method of determining whether a block should be established relates to testing the initial request for the existence of a "maxwaittime" header. The mere presence of a maxwaittime header may indicate the desire to establish a block. Alternative embodiments may have predetermined flags that can be set to indicate the desire to establish a block. In yet another embodiment, a message may be sent to the client inquiring as to whether a block should be set. In such a case the response to the inquiry is evaluated to determine whether a block should be established.

If a block should be established, as determined by operation 416, flow branches YES to establish operation 418. Establish operation 418 establishes the block for a particular resource. In such a case any further or subsequent requests for that resource by any other client application programs other than the block owner are denied. The block itself may be another type of property associated with the resource that can be evaluated to determine if a requesting client should be allowed access to a resource. In an alternative embodiment, only requests for conflicting locks cause a denial, such that the block is effective against potentially conflicting lock requests but does not cause a denial of access when the resulting access does not conflict.

In an embodiment, the block has a lifetime established by the blocking client. Upon expiration of the lifetime of the block, operation 420 determines whether a conflicting lock still exists on the requested resource. If not, then flow branches NO to provide operation 406, which allows access to the resource. If so, then a message is sent to the client application to indicating that the block has expired and that the lock still exists and then flow branches YES to end operation 408.

In another embodiment, once the lock is released or harvested by the server computer system, then the block provides an indication that the subsequent client is interested in obtaining access to the resource. In such a case, the server can then inform the subsequent or blocking client that the resource is free. Thus, the block acts as a subscription to a lock-related event. This type of service may be provided in combination with determination act 420 shown in FIG. 4.

Figure 5:
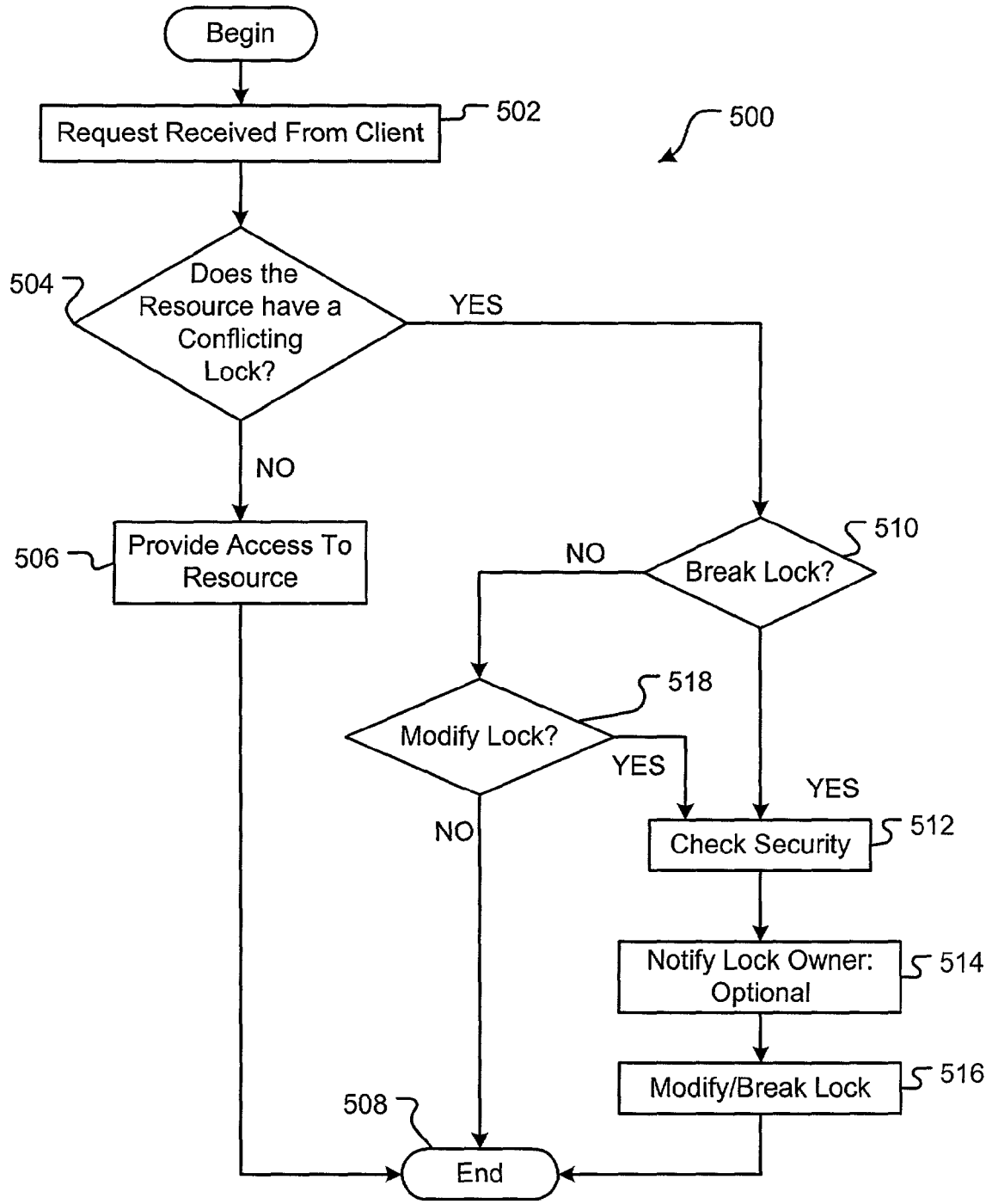
FIG. 5 is a flow diagram illustrating the functional components of modifying a resource lock and/or breaking the resource lock according to an alternative embodiment of the present invention.

In accordance with other aspects of the present invention, the services layer may provide services related to breaking and/or modifying existing locks. FIG. 5 is a flow chart of the operational characteristics related to breaking or modifying an existing lock object. As described above with respect to FIG. 4, prior to the beginning of flow 500 an object, such as object 304 and/or 306 shown in FIG. 3, exist within a Server System Resource Store, such as store 302.

Flow 500 begins with receive operation 502, wherein the receive operation 502 relates to the receipt, by the server system of any read, execution, or update access request for an object. The access attempt may be performed by a third party application, such as application 318 or 320 (FIG. 3) or by the services layer 314, or by yet other client-type requesting entities. The request itself may include information as to the type of access sought, any lock types to be created and enforced during the access, and/or a request for a lock token, etc. Additionally, the request may indicate whether an existing lock should be broken and/or modified, if one is present. Alternatively, the received request may simply be a request to break or modify a lock, apart from a request to access a resource.

Once the request has been received, determination act 504 determines whether the requested resource is locked. Thus, determination act 504 determines whether the resource is locked by another client application program by either searching for a lock object associated with the resource, analyzing properties of the resource object itself, or by searching for lock information in a look-up table type of data structure. In either situation, the server analyzes any lock information for the requested object and determines whether an associated lock conflicts with the type of access requested. In the alternative embodiment wherein the request relates to a request to break or modify a lock, then determination act 504 simply determines whether the lock exists.

If determination act 504 determines that the type of request does not conflict with any lock objects associated with the requested object, flow 500 branches NO to provide-access operation 506. Provide-access operation 506 is similar to provide operation 406 described above in conjunction with FIG. 4 and may also include creation of a lock for the requesting client. Once access has been provided, then flow 500 ends at end operation 508.

In alternative embodiments wherein the request is to break a lock, provide operation 506 may send a message to the client that the lock does not exist and flow branches to end operation 508.

If determination act 502 determines there is a lock associated with the requested resource that conflicts with the requested access, then flow 500 branches YES to test act 510. Test act 510 tests the request to determine whether the lock should be broken outright. Testing whether the lock is to broken relates to checking the request for an indication that lock should be broken, e.g., by the presence of break-latency header. If this header is present, then flow branches YES to check security operation 512.

Check security operation 512 determines whether the client application program has the requisite capabilities to perform the lock break. If not then the process ends and the lock is not broken. However, if the client application program does have the requisite security then the lock may be broken (or modified). In an embodiment, determining whether a client application program has the requisite security clearance involves testing the request to break the lock. In the request, the client application program may include information related to the whether the client can read or write to the resource. Depending on the level of permission allowed the client, the server may determine if the security check has been satisfied. Although a security check should be done to prevent uncontrolled lock harvesting, it is not necessary to the understanding of the present invention and practically any number of security validation techniques may be used to determine whether the client is able to break a lock.

Following the security check operation 512, notify step 514 notifies the lock owner that the lock is about to be broken or modified. Notifying the lock owner of an impending lock break may provide the owner time to perform a lock refresh action or some other action that may stop the break function. Alternatively, the notification may provide the owner time to perform another action, e.g., a save to prevent lost updates. Notify step 514 is an optional step in that some server systems may not notify the owner of the lock, yet such a notification may be preferred to protect owners from lost updates.

Once the notification has been completed, break operation 516 breaks the lock. Following break operation 516, flow 500 ends at end operation 508.

If test act 510 determines that the request does not indicate that the lock should be broken, e.g., by the absence of a predetermined header, then flow branches NO to test operation 518. Test operation 518 tests the initial request to determine whether the lock should be modified. Such a modification may relate to actually reducing the timeout period or modifying the sharing capabilities of the lock. The modification may, in essence, change the properties of a lock to thereby enable another client to access the resource. Determining whether the initial request includes a request to modify the lock may involve a test for the presence of an "update" or "modify" lock header in the request. The mere presence of one of these headers may provide the server an ability to determine whether the request is for modification of the lock.

If test operation 518 determines that the request does not request lock modification, then flow branches NO to end operation 508. However, if test operation 518 determines that the lock is to be modified, then flow branches YES to check operation 512. Check operation 512, as discussed above determines whether the client application program requesting the lock modification has the requisite security to perform such an action. Once the security check has completed, notify operation 514 notifies the lock owner that a modification is about to occur. As discussed above, notify operation is optional but may provide the lock owner time to perform a save or refresh act to prevent loss.

Following the notification, modify operation 516 performs the lock modification. The lock modification process may involve changing the locks properties, e.g., the timeout value, the sharing capabilities, etc. In alternative embodiments, the modification process may involve creating a new lock object, associating the new lock object with the resource and then deleting or harvesting the old lock object. In yet other embodiments, the actual modification process may be performed in other ways, but the end result is a lock object having different or modified properties. Once modified, flow 500 ends at end operation 508.

The above described system and method provides a significant advantage over prior methods of managing resource locks in a distributed environment. In particular, the communication of both expected lifetime information for a lock significantly improves the planning and selection of request timing issues and performance for client application programs. Additionally, the ability to block a resource pending an unlock event further increases performance for client applications. The breaking and modification of existing locks also improves overall control of lock allocation and management.

As discussed above, the invention described herein may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Additionally, although the invention has been described in language specific to structural features and/or methodological steps, it is to be understood that the invention defined in the appended claims is not necessarily limited to the specific features or steps described. Therefore, the specific features and steps are disclosed as preferred forms of implementing the claimed invention.

What is claimed is:

1. A computer implemented method of unlocking a locked resource in a distributed environment, the locked resource having a lock object associated with a lock owner, the method comprising:

receiving a request to access the locked resource, wherein the request originates from a requesting client computer system other than the lock owner and wherein the request comprises a request to break the lock object;

notifying the lock owner of the request to break the lock object;

determining whether the requesting client computer system is permitted to break the lock object; and removing the lock object from the resource if the requesting client computer system is permitted to break the lock object, wherein the lock object is not removed for a predetermined time following the act of notifying the lock owner of the request to break the lock object.

2. A computer implemented method of unlocking a locked resource in a distributed environment, the locked resource having a lock object associated with a lock owner, the method comprising:

receiving a request to access the locked resource, wherein the request originates from a requesting client computer system other than the lock owner and wherein the request comprises a request to break the lock object;

notifying the lock owner of the request to break the lock object;

determining whether the requesting client computer system is permitted to break the lock object; and removing the lock object from the resource if the requesting client computer system is permitted to break the lock object, wherein the lock object has a timeout property value and the timeout property value is modified to effectively remove the lock object.

3. A computer system for managing resources in a distributed environment, the distributed environment having a plurality of resources and wherein at least one resource is associated with a lock object, the system comprising:

a receive module for receiving a request from a requesting client application program to access at least one resource in the distributed environment, wherein the requesting client application program further requests to block the resource when requesting access to the resource;

a determination module for determining whether the resource has a conflicting lock object associated with the requested resource; and a communication module for returning lock information to the requesting client application program if the resource has a conflicting lock object, wherein the lock information returned to the requesting client application program relates to an expected lifetime of the conflicting lock object;

a blocking module for blocking access to the locked resource by the requesting client application program until an expiration of the expected lifetime of the conflicting lock object; and an allocation module for allocating a new lock object to the requesting client application program following the expiration of the expected lifetime of the conflicting lock object.

4. A system as defined in claim 3 wherein:

an owning client application program owns a lock object for the requested resource; and the owning client application program determines the expected lifetime of the lock object.

5. A system as defined in claim 4 wherein the requesting client application program modifies a request strategy based on received information from the communication module.

6. A computer system for managing resources in a distributed environment, the distributed environment having a plurality of resources and wherein at least one resource is associated with a lock object, the system comprising:

a receive module for receiving a request from a requesting client application program to access at least one resource in the distributed environment, wherein the receive module is adapted to receive a request to break an existing lock object;

a determination module for determining whether the resource has an existing lock object associated with the requested resource; and a communication module for returning lock information to the client application program if the resource has an existing lock object, wherein the lock information returned to the requesting client application program relates to an expected lifetime of the existing lock object;

a breaking module for removing the existing lock object for the requested resource in response to the receive module receiving a request from the requesting client application program to break the existing lock object; and a determination module that determines whether the requesting client application program is suitably authorized and wherein the existing lock object is not removed in response to the request to break the lock object unless the requesting client application program is suitably authorized.

* * * * *